(12) United States Patent
Adams et al.

(10) Patent No.: US 11,402,719 B2
(45) Date of Patent: Aug. 2, 2022

(54) RETROREFLECTIVE ELECTRO-OPTIC DISPLAYS

(71) Applicant: E Ink Corporation, Billerica, MA (US)

(72) Inventors: Timothy G Adams, Sudbury, MA (US); Jose Hernandez, Medford, MA (US)

(73) Assignee: E Ink Corporation, Billerica, MA (US)

( * ) Notice: Subject to any disclaimer, the term of this patent is extended or adjusted under 35 U.S.C. 154(b) by 87 days.

(21) Appl. No.: 16/708,607

(22) Filed: Dec. 10, 2019

(65) Prior Publication Data

US 2020/0183248 A1 Jun. 11, 2020

Related U.S. Application Data

(60) Provisional application No. 62/777,798, filed on Dec. 11, 2018.

(51) Int. Cl.
| | | |
|---|---|---|
| *G02F 1/1677* | (2019.01) | |
| *G02F 1/167* | (2019.01) | |
| *G02F 1/1676* | (2019.01) | |
| *G02F 1/16757* | (2019.01) | |
| *G02F 1/1335* | (2006.01) | |

(52) U.S. Cl.
CPC ............ *G02F 1/1677* (2019.01); *G02F 1/167* (2013.01); *G02F 1/1676* (2019.01); *G02F 1/16757* (2019.01); *G02F 1/133514* (2013.01); *G02F 1/133553* (2013.01); *G02F 2201/123* (2013.01)

(58) Field of Classification Search
CPC .. G02F 1/167; G02F 1/133514; G02F 1/1677; G02F 1/133354; G02F 1/1309; G02F 1/1334; G02F 1/133516; G02F 1/133519; G02F 1/157; G02F 1/16757; G02F 1/061; G02F 1/13306; G02F 1/133305; G02F 1/13338; G02F 1/1391; G02F 1/16753; G02F 1/1676; G02F 1/1681; G02F 1/1685; G02F 1/172; G02F 2001/1678; G02F 2201/52; G02F 2202/022; G02F 2202/28; G02F 2203/055; G02B 5/201; G02B 5/22
See application file for complete search history.

(56) References Cited

U.S. PATENT DOCUMENTS

| | | |
|---|---|---|
| 5,182,663 A | 1/1993 | Jones |
| 5,872,552 A | 2/1999 | Gordon, II et al. |
| 6,130,774 A | 10/2000 | Albert et al. |
| 6,144,361 A | 11/2000 | Gordon, II et al. |
| 6,172,798 B1 | 1/2001 | Albert et al. |
| 6,184,856 B1 | 2/2001 | Gordon, II et al. |

(Continued)

OTHER PUBLICATIONS

Kitamura, T. et al., "Electrical toner movement for electronic paper-like display", Asia Display/IDW '01, pp. 1517-1520, Paper HCS1-1 (2001).

(Continued)

*Primary Examiner* — Brandi N Thomas
(74) *Attorney, Agent, or Firm* — Brian D. Bean (57) ABSTRACT

An electro-optic display includes a first light-transmissive electrode, a layer of an electro-optic medium capable of being switched between an open state and a closed state upon application of an electric field, a second light-transmissive electrode, and a layer having a plurality of retroreflectors.

13 Claims, 3 Drawing Sheets

(56) References Cited

U.S. PATENT DOCUMENTS

| | | | |
|---|---|---|---|
| 6,184,949 B1* | 2/2001 | Cornelissen | G02F 1/133504 |
| | | | 349/106 |
| 6,225,971 B1 | 5/2001 | Gordon, II et al. | |
| 6,241,921 B1 | 6/2001 | Jacobson et al. | |
| 6,271,823 B1 | 8/2001 | Gordon, II et al. | |
| 6,452,734 B1 | 9/2002 | Whitehead et al. | |
| 6,657,766 B2 | 12/2003 | Minoura et al. | |
| 6,822,782 B2 | 11/2004 | Honeyman et al. | |
| 6,866,760 B2 | 3/2005 | Paolini Jr. et al. | |
| 6,922,276 B2 | 7/2005 | Zhang et al. | |
| 6,982,178 B2 | 1/2006 | LeCain et al. | |
| 7,002,728 B2 | 2/2006 | Pullen et al. | |
| 7,012,600 B2 | 3/2006 | Zehner et al. | |
| 7,012,735 B2 | 3/2006 | Honeyman et al. | |
| 7,072,095 B2 | 7/2006 | Liang et al. | |
| 7,075,502 B1 | 7/2006 | Drzaic et al. | |
| 7,116,318 B2 | 10/2006 | Amundson et al. | |
| 7,144,942 B2 | 12/2006 | Zang et al. | |
| 7,170,670 B2 | 1/2007 | Webber | |
| 7,173,752 B2 | 2/2007 | Doshi et al. | |
| 7,236,291 B2 | 6/2007 | Kaga et al. | |
| 7,312,784 B2 | 12/2007 | Baucom et al. | |
| 7,321,459 B2 | 1/2008 | Masuda et al. | |
| 7,339,715 B2 | 3/2008 | Webber et al. | |
| 7,411,719 B2 | 8/2008 | Paolini, Jr. et al. | |
| 7,453,445 B2 | 11/2008 | Amundson | |
| 7,475,997 B2* | 1/2009 | Fujiwara | G02B 5/124 |
| | | | 349/113 |
| 7,535,624 B2 | 5/2009 | Amundson et al. | |
| 7,561,324 B2 | 7/2009 | Duthaler et al. | |
| 7,679,814 B2 | 3/2010 | Paolini, Jr. et al. | |
| 7,715,088 B2 | 5/2010 | Liang et al. | |
| 7,839,564 B2 | 11/2010 | Whitesides et al. | |
| 8,009,348 B2 | 8/2011 | Zehner et al. | |
| 9,279,906 B2 | 3/2016 | Kang | |
| 9,366,935 B2 | 6/2016 | Du et al. | |
| 9,372,380 B2 | 6/2016 | Du et al. | |
| 9,436,056 B2* | 9/2016 | Paolini, Jr. | G02F 1/133514 |
| 9,921,451 B2 | 3/2018 | Telfer et al. | |
| 10,444,553 B2 | 10/2019 | Laxton | |
| 2014/0011913 A1 | 1/2014 | Du et al. | |
| 2015/0005720 A1 | 1/2015 | Zang | |
| 2016/0012710 A1 | 1/2016 | Lu et al. | |
| 2018/0017741 A1* | 1/2018 | Ho | G02B 6/4212 |

OTHER PUBLICATIONS

Yamaguchi, Y. et al., "Toner display using insulative particles charged triboelectrically", Asia Display/IDW '01, pp. 1729-1730, Paper AMD4-4 (2001).

Schultz, P. et al., "Investigation of five types of switchable retroreflector films for enhanced visible and infrared conspicuity applications", Applied Optics; vol. 51, No. 17, pp. 3744-3754, (Jun. 10, 2012).

* cited by examiner

RETROREFLECTIVE ELECTRO-OPTIC DISPLAYS

REFERENCE TO RELATED APPLICATIONS

This application claims priority to U.S. Provisional Application No. 62/777,798, filed on Dec. 11, 2018. The entire contents of this application are herein incorporated by reference.

BACKGROUND OF INVENTION

This invention relates to retroreflective displays. More specifically, in one aspect this invention relates to displays including retroreflectors and a layer of electro-optic media.

SUMMARY OF INVENTION

According to one aspect, an electro-optic display is provided, which comprises, in order a first light-transmissive electrode, a layer of an electro-optic medium capable of being switched between an open state and a closed state upon application of an electric field, a second light-transmissive electrode, and a layer comprising a plurality of retro-reflectors.

These and other aspects of the present invention will be apparent in view of the following description.

BRIEF DESCRIPTION OF FIGURES

The drawing Figures depict one or more implementations in accord with the present concepts, by way of example only, not by way of limitations. The drawings are not to scale. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details.

Generally, the various embodiments of the present invention provide an electro-optic display that includes a layer having an array of retro-reflectors and a variable transmissive electro-optic medium for allowing or preventing light from reaching the array. The term "electro-optic", as applied to a material or a display, is used herein in its conventional meaning in the imaging art to refer to a material having first and second display states differing in at least one optical property, the material being changed from its first to its second display state by application of an electric field to the material.

Figure 1:
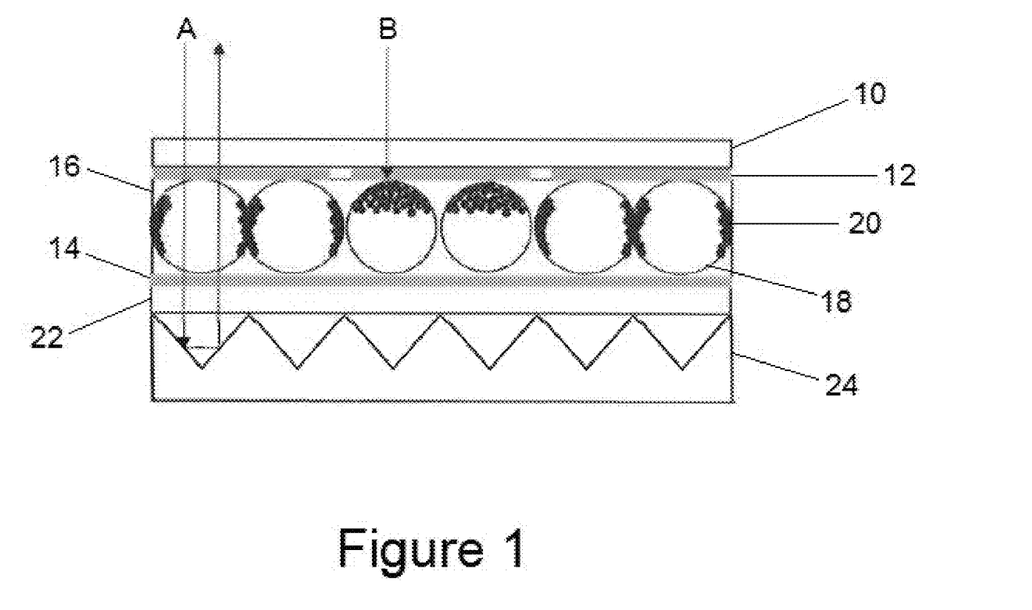
FIG. 1 is a schematic cross-sectional view of an electro-optic display according to a first embodiment of the present invention.

Referring now to FIG. 1, an electro-optic display according to a first embodiment of the present invention is illustrated. The top surface, as illustrated, provides the viewing surface of the display. The top layer may be a light-transmissive protective layer 10, and comprise a glass or more preferably a flexible plastic sheet, such as polyethylene terephthalate. The term "light-transmissive" is used herein with respect to the various layers of the display to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term "light-transmissive" should of course be interpreted to refer to transmission of the relevant non-visible wavelengths.

Below the top layer 10 is a layer of electro-optic medium. The electro-optic materials used in the various embodiments of the present invention are preferably solid in the sense that the materials have solid external surfaces, although the materials may, and often do, have internal liquid- or gas-filled spaces. Various types of solid electro-optic materials that may be used in the various embodiments of the present include, but are not limited to, electrochromic materials, encapsulated electrophoretic materials, and encapsulated liquid crystal materials. Other types of electro-optic media may also be used in the displays of the present invention.

The electro-optic materials are also preferably bistable. The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element.

The layer of electro-optic media in the displays made according to the various embodiments of the present invention preferably comprise an encapsulated particle-based electrophoretic medium, such as layer 16 of FIG. 1. In particle-based electrophoretic media, a plurality of charged particles move through a fluid under the influence of an electric field. Electrophoretic displays can have attributes of good brightness and contrast, wide viewing angles, state bistability, and low power consumption when compared with liquid crystal displays, for example.

The displays according to the various embodiments of the present invention have at least one electrode layer, preferably two electrode layers as illustrated in FIG. 1 wherein a first light transmissive electrode layer 12 and second light transmissive electrode layer 14 are located on opposing sides of the layer of electro-optic medium 16. The electrode layers apply a potential across the layer of electro-optic medium, so that the electro-optic medium switches between an open state (light-transmissive) and a closed state (opaque) upon application of an electric field in a so-called "shutter mode." See, for example, U.S. Pat. Nos. 5,872,552; 6,130,774; 6,144,361; 6,172,798; 6,271,823; 6,225,971; and 6,184,856.

The electrode layers may be provided in several forms. For example, the electrode layer may be a continuous layer of conductive material, such as indium tin oxide. Alternatively, the electrodes may be divided into a plurality of segments of conductive material, such that each segment is independently controllable. In another embodiment, one or both of the electrode layers may be patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which may be independently addressed and defines one pixel of the display.

As illustrated in FIG. 1, when a field is applied to the device, the dark particles 20 within a capsule 18 move toward the viewing surface, thereby changing the optical state to opaque and preventing light, such as light ray B, from being transmitted through the layer of electro-optic medium 16. When an alternating electric field is applied to one of the electrodes, the charged pigment particles 20 are driven to the side walls of the capsule 18, resulting in an aperture through the capsule 18 for the transmission of light, such as light ray A. In addition to the charged particles 20, the capsule contains a fluid, preferably a non-polar solvent that may comprise charge control agents and/or stabilizers, such that the optical state (open/closed) can be maintained for long periods of time (weeks) without the need to maintain the electric field. As a result, the device may be "switched" only a couple of times a day and consume very little power. The fluid may be light-transmissive and colorless in some embodiments or light-transmissive and colored, e.g. red, green, blue, cyan, magenta, and yellow.

A film or sheet 24 comprising an array of retro-reflectors may be provided within a layer of the device, as illustrated in FIG. 1, such that light received and reflected by the reflectors are transmitted through the layer of electro-optic medium 16. A retro-reflector reflects light back to its source with a minimum of scattering. Types of retro-reflectors that may be used in various embodiments of the present invention include, but are not limited to, microprisms/corner reflectors, microbeads/hemispherical reflectors. Retro-reflective films are available from various commercial suppliers in a variety of grades with a range of brightness, viewing angles, and colors and typically used for applications that require high-brightness at night, for example. In some applications prism-type reflectors may be preferred because they are generally brighter than microbead-type reflectors; however, micro-bead type reflectors generally provide displays with a wider viewing angle, which may be preferred in some applications. The displays made according to the various embodiments of the present invention may be well suited for applications, such as road signs, road surfaces, or safety reflectors that may be incorporated into vehicles or uniforms.

Figure 2A:
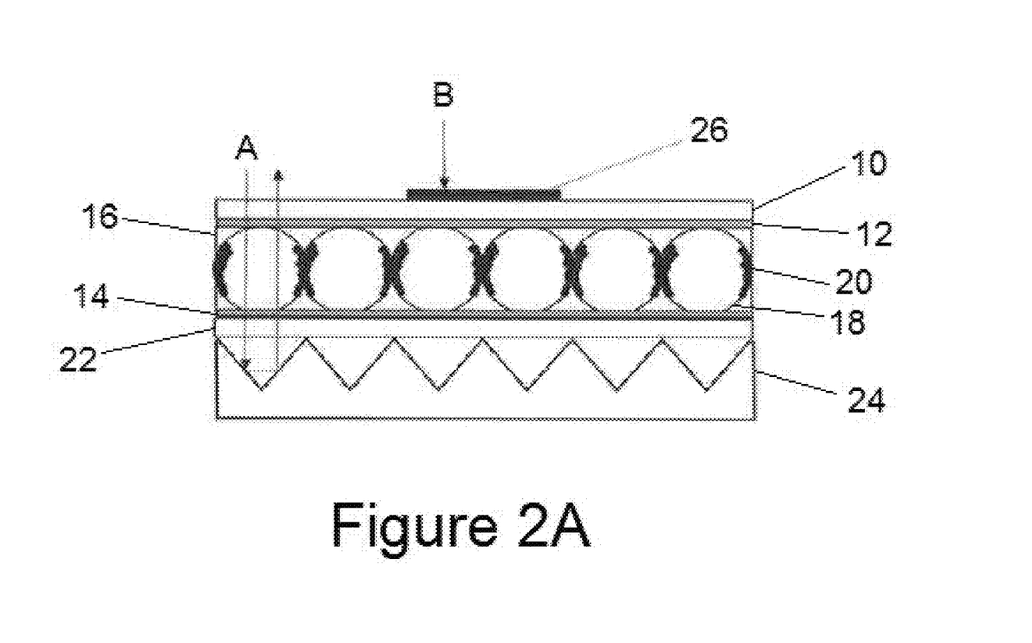
FIGS. 2A and 2B are schematic cross-sectional views of an electro-optic display in an open and closed state, respectively, according to a second embodiment of the present invention.
Figure 2B:
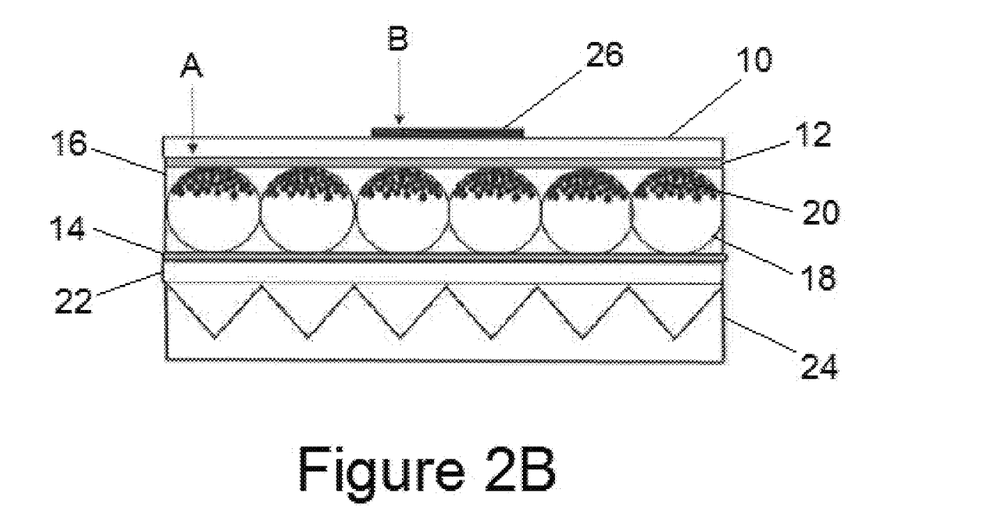

In a display made according to a second embodiment of the present invention, a non-switchable colored material may be incorporated into the display stack. For example, as illustrated in FIGS. 2A and 2B, a darkly colored material 26, such as a paint or ink, may be a similar or different color as the charged particles 20, may be applied to or printed on at least a portion of the viewing surface on the top protective layer 10. When the layer of electro-optic media 16 is in an open state, the light, such as light ray A, may be transmitted through the electro-optic media 16 and reflected back from the retro-reflectors 24. It is preferable that the colored material 26 is not light-transmissive, so that significantly less light, such as light ray B, will be reflected from the static colored material 26. Therefore, in an open state, a high contrast may be provided by the display between the colored material 26 and the surrounding viewing surface area providing a bright and highly legible display image. In a closed state, as illustrated in FIG. 2B, the contrast of the displayed image is much less, resulting in an obscured image, if as previously, mentioned, the color or other optical properties of the particles 20 are similar to the color or other optical properties of the colored material 26. In other variations of this embodiment, the colored material 26 may be incorporated into another layer of the display stack. For example, the colored material 26 may be inserted between any of the layers above the retro-reflectors or alternatively, incorporated into a portion of any of the layers. If the colored material is incorporated between the array of retro-reflectors 24 and electro-optic media 16, it is less necessary for the appearance of the particles 20 to be similar to the colored material 26 because the particles 20 will shield the view of the colored material 26 when the display in a closed state.

Figure 3A:
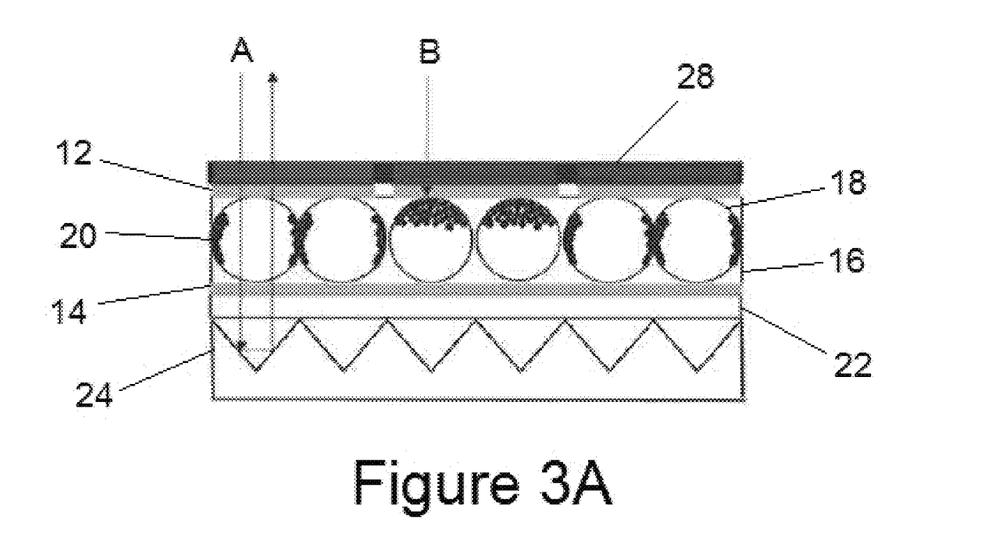
FIG. 3A is a schematic cross-sectional view of an electro-optic display according to a third embodiment of the present invention.
Figure 3B:
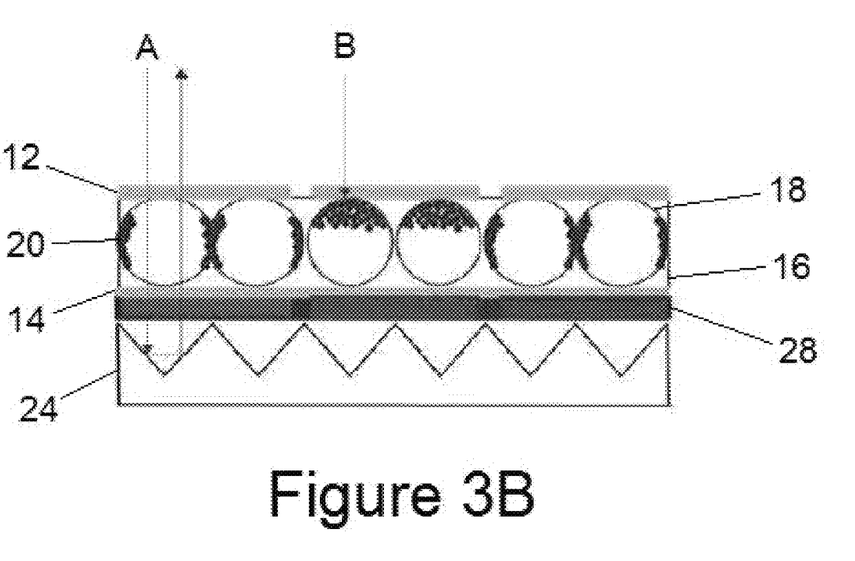
FIG. 3B is a schematic cross-sectional view of an electro-optic display according to a fourth embodiment of the present invention.

In yet another embodiment of the present invention, a color filter array may be incorporated into the display stack. Unlike the colored material of the previous embodiment, the filter array preferably comprises a light-transmissive colored material. For example, referring to FIGS. 3A and 3B, a color filter array 28 comprising red, green, and blue sections may be incorporated either above the layer of electro-optic media 16 or between the electro-optic media 16 and the retro-reflectors 24. When the particles 20 are switched to an open state, light transmitted through the red portion of the filter array 28, such as light ray A, will be reflected by the retro-reflectors 24 and display a red color to the viewer. In a closed state, light is less likely to transmit through the particles 20 or be reflected, such as light ray B, and a dark optical state will be displayed to the viewer. Similar to the colored material of the previous embodiment, the color filter array may be inserted between any of the display layers above the retro-reflectors or incorporated into any of the layers. For example, in FIGS. 3A and 3B, either of the electrode layers 12, 14 may be made of a light-transmissive conductive colored material, such that the electrode layers may serve as both electrodes and a color filter array, thereby reducing the number of layers and the thickness of the stack.

As noted above, the electro-optic medium used in the various embodiments of the present invention is preferably an encapsulated electrophoretic medium. Numerous patents and applications assigned to or in the names of the Massachusetts Institute of Technology (MIT), E Ink Corporation, E Ink California, LLC and related companies describe various technologies used in encapsulated electrophoretic and other electro-optic media. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. Alternatively, the charged particles and the fluid are not encapsulated within microcapsules but instead are retained within a plurality of cavities formed within a carrier medium, typically a polymeric film. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. 7,116,318 and 7,535,624;

(g) Color formation and color adjustment; see for example U.S. Pat. Nos. 7,075,502 and 7,839,564;

(h) Methods for driving displays; see for example U.S. Pat. Nos. 7,012,600 and 7,453,445;

(i) Applications of displays; see for example U.S. Pat. Nos. 7,312,784 and 8,009,348; and (j) Non-electrophoretic displays, as described in U.S. Pat. No. 6,241,921 and U.S. Patent Applications Publication No. and 2015/0277160; and applications of encapsulation and microcell technology other than displays; see for example U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

Whether encapsulated in a microcapsule, microcell, or droplet within a continuous polymeric phase, the dispersions containing the plurality of charged particles also contain a fluid, as well as other optional additives. The dispersion fluid is preferably a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291.

The charged pigment particles may be of a variety of colors (e.g. red, green, blue, cyan, magenta, yellow, white, orange, and black) and compositions. Additionally, the charged pigment particles may be functionalized with surface polymers to improve state stability. Such pigments are described in U.S. Patent Publication No. 2016/0085132, which is incorporated by reference in its entirety. For example, if the charged particles are of a white color, they may be formed from an inorganic pigment such as $TiO_2$, $ZrO_2$, $ZnO$, $Al_2O_3$, $Sb_2O_3$, $BaSO_4$, $PbSO_4$ or the like. They may also be polymer particles with a high refractive index (>1.5) and of a certain size (>100 nm) to exhibit a white color, or composite particles engineered to have a desired index of refraction. Black charged particles, they may be formed from CI pigment black 26 or 28 or the like (e.g., manganese ferrite black spinel or copper chromite black spinel) or carbon black. Other colors (non-white and non-black) may be formed from organic pigments such as CI pigment PR 254, PR122, PR149, PG36, PG58, PG7, PB28, PB15:3, PY83, PY138, PY150, PY155 or PY20. Other examples include Clariant Hostaperm Red D3G 70-EDS, Hostaperm Pink E-EDS, PV fast red D3G, Hostaperm red D3G 70, Hostaperm Blue 132G-EDS, Hostaperm Yellow H4G-EDS, Novoperm Yellow HR-70-EDS, Hostaperm Green GNX, BASF Irgazine red L 3630, Cinquasia Red L 4100 HD, and Irgazin Red L 3660 BD; Sun Chemical phthalocyanine blue, phthalocyanine green, diarylide yellow or diarylide AAOT yellow. Color particles can also be formed from inorganic pigments, such as CI pigment blue 28, CI pigment green 50, CI pigment yellow 227, and the like. The surface of the charged particles may be modified by known techniques based on the charge polarity and charge level of the particles required, as described in U.S. Pat. Nos. 6,822,782, 7,002,728, 9,366,935, and 9,372,380 as well as US Publication No. 2014-0011913, the contents of all of which are incorporated herein by reference in their entireties.

The particles may exhibit a native charge, or may be charged explicitly using a charge control agent, or may acquire a charge when suspended in a solvent or solvent mixture. Suitable charge control agents are well known in the art; they may be polymeric or non-polymeric in nature or may be ionic or non-ionic. Examples of charge control agent may include, but are not limited to, Solsperse 17000 (active polymeric dispersant), Solsperse 9000 (active polymeric dispersant), OLOA® 11000 (succinimide ashless dispersant), Unithox 750 (ethoxylates), Span 85 (sorbitan trioleate), Petronate L (sodium sulfonate), Alcolec LV30 (soy lecithin), Petrostep B100 (petroleum sulfonate) or B70 (barium sulfonate), Aerosol OT, polyisobutylene derivatives or polyethylene co-butylene) derivatives, and the like. In addition to the suspending fluid and charged pigment particles, internal phases may include stabilizers, surfactants and charge control agents, A stabilizing material may be adsorbed on the charged pigment particles when they are dispersed in the solvent. This stabilizing material keeps the particles separated from one another so that the variable transmission medium is substantially non-transmissive when the particles are in their dispersed state.

As is known in the art, dispersing charged particles (typically a carbon black, as described above) in a solvent of low dielectric constant may be assisted by the use of a surfactant. Such a surfactant typically comprises a polar "head group" and a non-polar "tail group" that is compatible with or soluble in the solvent, in the present invention, it is preferred that the non-polar tail group be a saturated or unsaturated hydrocarbon moiety, or another group that is soluble in hydrocarbon solvents, such as for example a poly(dialkylsiloxane). The polar group may be any polar organic functionality, including ionic materials such as ammonium, sulfonate or phosphonate salts, or acidic or basic groups. Particularly preferred head groups are carboxylic acid or carboxylase groups. Stabilizers suitable for use with the invention include polyisobutylene and polystyrene. In some embodiments, dispersants, such as polyisobutylene succinimide and/or sorbitan trioleate, and/or 2-hexyldecanoic acid are added.

The fluids used in the variable transmission media of the present invention will typically be of low dielectric constant (preferably less than 10 and desirably less than 3). The fluids are preferably solvents that have low viscosity, relatively high refractive index, low cost, low reactivity, and low vapor pressure/high boiling point. Examples of solvents include, but are not limited to, aliphatic hydrocarbons such as heptane, octane, and petroleum distillates such as Isopar® (Exxon Mobil) or Isane® (Total); terpenes such as limonene, e.g., 1-limonene; and aromatic hydrocarbons such as toluene. A particularly preferred solvent is limonene, since it combines a low dielectric constant (2.3) with a relatively high refractive index (1.47). The index of refraction of the internal phase may be modified with the addition of the index matching agents. For example, the aforementioned U.S. Pat. No. 7,679,814 describes an electrophoretic medium suitable for use in a variable transmission device in which the fluid surrounding the electrophoretic particles comprises a mixture of a partially hydrogenated aromatic hydrocarbon and a terpene, a preferred mixture being d-limonene and a partially hydrogenated terpene, available commercially as Cargille® 5040 from Cargille-Sacher Laboratories, 55 Commerce Rd, Cedar Grove N.J. 07009. In the encapsulated media made according to various embodiments of the present invention, it is preferred that the refractive index of the encapsulated dispersion match as closely as possible to that of the encapsulating material to reduce haze. In most instances, it is beneficial to have an internal phase with an index of refraction between 1.51 and 1.57 at 550 nm, preferably about 1.54 at 550 nm.

In a preferred embodiment of the present invention, the encapsulated fluid may comprise one or more nonconjugated olefinic hydrocarbons, preferably cyclic hydrocarbons. Examples of nonconjugated olefinic hydrocarbons include, but are not limited to, terpenes, such as limonene; phenyl cyclohexane; hexyl benzoate; cyclododecatriene; 1,5-dimethyl tetralin; partially hydrogenated terphenyl, such as Cargille® 5040; phenylmethylsiloxane oligomer; and combinations thereof. A most preferred composition for the encapsulated fluid according to an embodiment of the present invention comprises cyclododecatriene and a partially hydrogenated terphenyl.

Electrophoretic media comprising microcapsules also generally include a binder to assist in the coating of the electrophoretic media onto a substrate. A mixture of fish gelatin and a polyanion, such as acacia has been found to be an excellent binder for use with capsules formed from a coacervate of (pig) gelatin and acacia. Polyanions that may be included in the binder with fish gelatin include, but are not limited to, carbohydrate polymers, such as starch and cellulose derivatives, plant extracts (e.g. acacia), and polysaccharides (e.g. alginate); proteins, such as gelatin or whey protein; lipids, such as waxes or phospholipids; and combinations thereof.

The gelatin-based capsule walls have been described in many of the E Ink and MIT patents and applications mentioned above. The gelatin is available from various commercial suppliers, such as Sigma Aldrich or Gelitia USA. It can be obtained in a variety of grades and purity depending upon the needs of the application. Gelatin primarily comprises collagen that has been collected from animal products (cow, pig, poultry, fish) and hydrolyzed. It comprises a mixture of peptides and proteins. In many of the embodiments described herein the gelatin is combined with acacia (gum arabic), which is derived from the hardened sap of the acacia tree. Acacia is a complex mixture of glycoproteins and polysaccharides, and it is often used as a stabilizer in food stuffs. The pH of aqueous solutions of acacia and gelatin can be tuned to form a polymer-rich coacervate phase that can encapsulate droplets of a non-polar internal phase.

Capsules incorporating gelatin/acacia may be prepared as follows; see, for example U.S. Pat. No. 7,170,670, incorporated by reference in its entirety. In this process, an aqueous mixture of gelatin and/or acacia is emulsified with a hydrocarbon internal phase (or other water-immiscible phase which it is desired to encapsulate) to encapsulate the internal phase. The solution may be heated to 40° C. prior to emulsification—to dissolve the gelatin. The pH is typically lowered to form a coacervate after the desired drop size distribution is achieved. Capsules are formed upon controlled cooling and mixing of the emulsion—typically to room temperature or lower. Proper mixing and certain encapsulation formulations (e.g. gelatin & acacia concentrations & pH) to discretely gel the coacervate around the internal phase droplets in a uniform manner are achieved if the wetting and spreading conditions are correct, which is largely dictated by the internal phase composition. The process yields capsules in the range of 20-100 m and often incorporates over 50 percent of the starting materials into useable capsules. The capsules produced are then separated by size by sieving or other size exclusion sorting.

The manufacture of a multi-layer electro-optic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive. An additional step may be incorporated in a manufacturing process to make a display according to the various embodiments of the present invention, which is to further laminate the film comprising the array of retro-reflectors to the backplane using a similar lamination adhesive, such as the layer of lamination adhesive 22 illustrated in the Figures.

The aforementioned U.S. Pat. No. 6,982,178 describes a method of assembling a solid electro-optic display (including an encapsulated electrophoretic display) which is well adapted for mass production. Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The substrate will typically be a polymeric film, and will normally have a thickness in the range of about 1 to about 25 mil (25 to 634 µm), preferably about 2 to about 10 mil (51 to 254 µm). The electrically-conductive layer is conveniently a thin metal or metal oxide layer of, for example, aluminum or ITO, or may be a conductive polymer. Poly(ethylene terephthalate) (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

U.S. Pat. No. 7,561,324 describes a so-called "double release sheet" which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

U.S. Pat. No. 7,839,564 describes a so-called "inverted front plane laminate", which is a variant of the front plane laminate described in the aforementioned U.S. Pat. No. 6,982,178. This inverted front plane laminate comprises, in order, at least one of a light-transmissive protective layer and a light-transmissive electrically-conductive layer; an adhesive layer; a layer of a solid electro-optic medium; and a release sheet. This inverted front plane laminate is used to form an electro-optic display having a layer of lamination adhesive between the electro-optic layer and the front electrode or front substrate; a second, typically thin layer of adhesive may or may not be present between the electro-optic layer and a backplane. Such electro-optic displays can combine good resolution with good low temperature performance.

The lamination adhesive may be present between any of the layers of the display stack, and the presence of this lamination adhesive layer affects the electro-optic characteristics of the displays. In particular, the electrical conductivity of the lamination adhesive layer affects both the low temperature performance and the resolution of the display. The low temperature performance of the display can (it has been found empirically) be improved by increasing the conductivity of the lamination adhesive layer, for example by doping the layer with tetrabutylammonium hexafluorophosphate or other materials as described in the aforementioned U.S. Pat. Nos. 7,012,735 and 7,173,752.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

All of the contents of the aforementioned patents and applications are incorporated by reference herein in their entireties.

We claim:

1. An electro-optic display comprising, in order:
   an opaque material,
   a light-transmissive top layer, wherein the opaque material covers only a portion of the light-transmissive top layer,
   a first light-transmissive electrode,
   a layer of a bistable electrophoretic medium comprising charged particles in a fluid, the bistable electrophoretic medium capable of being switched between an open state and a closed state upon application of an electric field wherein after switching the open state or closed state persists without application of the electric field,
   a second light-transmissive electrode,
   a layer comprising a plurality of retro-reflectors.

2. The electro-optic display of claim 1, wherein at least one of the first and second light-transmissive electrode layers comprises a plurality of pixel electrodes.

3. The electro-optic display of claim 1, wherein at least one of the first and second light-transmissive electrode layers comprises a plurality of segments of conductive material.

4. The electro-optic display of claim 1 further comprising a color filter array, such that the layer of electro-optic medium is between the color filter array and the plurality of retro-reflectors.

5. The electro-optic display of claim 1 further comprising a color filter array, such that the color filter array is between the layer of electro-optic medium and the plurality of retro-reflectors.

6. The electro-optic display of claim 1, wherein at least one of the first and second light transmissive electrodes comprises a colored conductive material.

7. The electro-optic display of claim 6, wherein the colored conductive material is at least one of red, green, and blue.

8. The electro-optic display of claim 1, wherein the charged particles have a color selected from the group consisting of red, green, blue, cyan, magenta, yellow, white, orange, and black.

9. The electro-optic display of claim 1, wherein the fluid is colorless.

10. The electro-optic display of claim 1, wherein a color of the fluid is selected from the group consisting of red, green, blue, cyan, magenta, and yellow.

11. The electro-optic display of claim 1, wherein the charged particles and the fluid are encapsulated within a plurality of capsules.

12. The electro-optic display of claim 1, wherein the bistable electrophoretic medium further comprises a polymeric sheet comprising a plurality of sealed microcells and the charged particles and the fluid are encapsulated within the plurality of sealed microcells.

13. The electro-optic display of claim 1, wherein the bistable electrophoretic medium further comprises a continuous polymeric phase and the charged particles and the fluid are provided in a plurality of droplets encapsulated in the continuous polymeric phase.

* * * * *